United States Patent [19]

Koch et al.

[11] Patent Number: 4,658,851

[45] Date of Patent: Apr. 21, 1987

[54] REVERSING VALVE CONSTRUCTION AND METHOD OF MAKING THE SAME

[76] Inventors: Rudolf K. Koch; Octávio F. Affonso, both of Rua Tronca, 1370-Caxias do Sul - C.P. 308, Brazil

[21] Appl. No.: 784,601

[22] Filed: Oct. 4, 1985

Related U.S. Application Data

[62] Division of Ser. No. 621,608, Jun. 18, 1984, Pat. No. 4,564,045.

[51] Int. Cl.[4] .................... F16K 11/02; F16K 31/122
[52] U.S. Cl. ................................ 137/15; 137/625.66; 251/175
[58] Field of Search ...................... 137/625.64, 625.43, 137/625.65, 625.66, 15; 91/395, 394; 251/86, 84, 175; 403/122, 130, 131, 143; 264/293

[56] References Cited

U.S. PATENT DOCUMENTS

| | | | |
|---|---|---|---|
| 769,248 | 9/1904 | Brainard | 403/143 X |
| 1,041,123 | 10/1912 | Lord | 251/86 X |
| 3,305,207 | 2/1967 | Calderoni et al. | 251/86 |
| 3,400,736 | 9/1968 | Bastle et al. | 137/625.43 |
| 4,564,045 | 1/1986 | Koch et al. | 137/625.43 |

Primary Examiner—Robert G. Nilson
Attorney, Agent, or Firm—Candor, Candor & Tassone

[57] ABSTRACT

A reversing valve construction having a housing provided with a chamber carrying a movable valve member therein that controls ports of a valve seat of the housing through the relative position of a cavity of the valve member relative to the ports, the ports comprising first, second and third ports disposed in spaced apart and straight line relation and the cavity bridging the first and second ports while exposing the chamber to the third port when the valve member is in one position thereof and bridging the second and third ports while exposing the chamber to the first port when the valve member is in another position thereof. The valve member carries a flexible annular sealing member that is disposed between an annular surface of the valve member and the valve seat and surrounds the cavity to seal the cavity to the valve seat while permitting sliding movement therebetween. The housing carries a biasing unit that is operatively associated with the valve member and the housing to urge and flex the sealing member into sealing engagement with the valve seat so as to tend to sealingly conform the flexible sealing member to the contour of the valve seat. The valve member has a rigid annular projection extending from the annular surface thereof and engaging the annular sealing member outboard of and around the cavity.

5 Claims, 14 Drawing Figures

REVERSING VALVE CONSTRUCTION AND METHOD OF MAKING THE SAME

CROSS REFERENCE TO RELATED APPLICATION

This application is divisional patent application of its copending parent patent application, Ser. No. 621,608, filed June 18, 1984, now U.S. Pat. No. 4,564,045.

BACKGROUND OF THE INVENTION

1. Field of the Invention

This invention relates to an improved reversing valve construction and to a method of making the same.

2. Prior Art Statement

It is known to provide a reversing valve construction having a housing means provided with a chamber carrying a movable valve member therein that controls port means of the valve seat means of the housing means through the relative position of a cavity of the valve member relative to the port means, the port means comprising first, second and third ports disposed in spaced apart and straight line relation and the cavity bridging the first and second ports while exposing the chamber to the third port when the valve member is in one position thereof and bridging the second and third ports while exposing the chamber to the first port when the valve member is in another position thereof. The valve member carries a flexible annular sealing member that is disposed between an annular surface of the valve member and the valve seat means and surrounds the cavity to seal the cavity to the valve seat means while permitting sliding movement therebetween. The housing means carries biasing means that is operatively associated with the valve member and the housing means to urge and flex the sealing member into sealing engagement with the valve seat means so as to tend to sealingly conform the flexible sealing member to the contour of the valve seat means.

For example, see the following three U.S. Patents:
(1) U.S. Pat. No. 4,144,905 - Bauer
(2) U.S. Pat. No. 4,213,483 - Bauer
(3) U.S. Pat. No. 4,240,469 - Bauer It is also known to provide a reversing valve construction having a housing means provided with a movable valve member therein that is operatively interconnected to a piston unit disposed in the housing means and having opposed piston heads each of which is disposed in sliding and sealing engagement with an internal peripheral surface of the housing means so as to define a main chamber between the piston heads and a pair of outboard control chambers respectively between the piston heads and the opposed ends of the housing means, each piston head having bleed orifice means interconnecting its respective control chamber to the main chamber, each of the piston heads having a poppet valve member for closing a valve seat carried by the respective end of the housing means and leading to its respective control chamber.

For example, see the following two U.S. Patents:
(4) U.S. Pat. No. 3,032,312 - Greenawalt
(5) U.S. Pat. No. 4,245,670 - Bauer et al

SUMMARY OF THE INVENTION

It is one feature of this invention to provide a reversing valve construction having improved sealing of the main valve member thereof to its valve seat means while still permitting sliding movement relative thereto so as to minimize fluid leakage between the high pressure chamber of the reversing valve construction and its low pressure connection for the reasons fully set forth in the aforementioned U.S. Pat Nos. 4,144,950; 4,213,483 and 4,240,469 whereby such three U.S. Patents are being incorporated into this disclosure by this reference thereto.

In particular, it was found according to the teachings of this invention that an annular sealing member can be carried by the main valve member of the reversing valve construction between the main valve member and the valve seat means to conform to the contour of that valve seat means through the use of a rigid annular projection on the main valve member which urges the annular flexible sealing member into sealing engagement by a biasing means that is operatively interconnected to the housing means and the main valve member as well as by the resulting pressure differential that acts across the valve member.

For example, one embodiment of this invention provides a reversing valve construction having a housing means provided wtih a chamber carrying a movable valve member therein that controls port means of a valve seat means of the housing means through the relative position of a cavity of the valve member relative to the port means, the port means comprising first, second and third ports disposed in spaced apart and straight line relation and the cavity bridging the first and second ports while exposing the chamber to the third port when the valve member is in one position thereof and bridging the second and third ports while exposing the chamber to the first port when the valve member is in another position thereof. The valve member carries a flexible annular sealing member that is disposed between an annular surface of the valve member and the valve seat means and surrounds the cavity to seal the cavity to the valve seat means while permitting sliding movement therebetween. The housing means carries a biasing means that is operatively associated with the valve member and the housing means to urge and flex the sealing member into sealing engagement with the valve seat means so as to tend to sealingly conform the flexible sealing member to the contour of the valve seat means. The valve member has a rigid annular projection extending from the annular surface thereof and engaging the annular sealing member outboard of and around the cavity.

It is another feature of this invention to provide improved poppet valve means on the piston heads of a reversing valve construction.

In particular, it was found according to the teachings of this invention that improved sealing of the respective poppet valve member of a piston head of a reversing valve construction with its associated valve seat means can be provided if that poppet valve member is universally mounted so as to self-align itself when moved against its respective valve seat means by the piston head assembly.

For example, another embodiment of this invention provides a reversing valve construction having a housing means provided with a movable valve member therein that is operatively interconnected to a piston unit disposed in the housing means and having opposed piston heads of which is disposed in sliding and sealing engagement with an internal peripheral surface of the housing means so as to define a main chamber between the piston heads and a pair of outboard control chambers respectively between the piston heads and opposed ends of the housing means. Each piston head has a bleed orifice means interconnecting its respective control chamber to the main chamber. Each piston head has a poppet valve member for closing a valve seat carried by the respective end of the housing means and leading to its respective control member. Each poppet valve member has a stem provided with an end that is universally mounted to its respective piston head so as to self-align the poppet valve member with its respective valve seat when moved thereagainst by the piston unit.

Accordingly, it is an object of this invention to provide an improved reversing valve construction having one or more of the novel features of this invention as set forth above or hereinafter shown or described.

Another object of this invention is to provide an improved method of making such a reversing valve construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
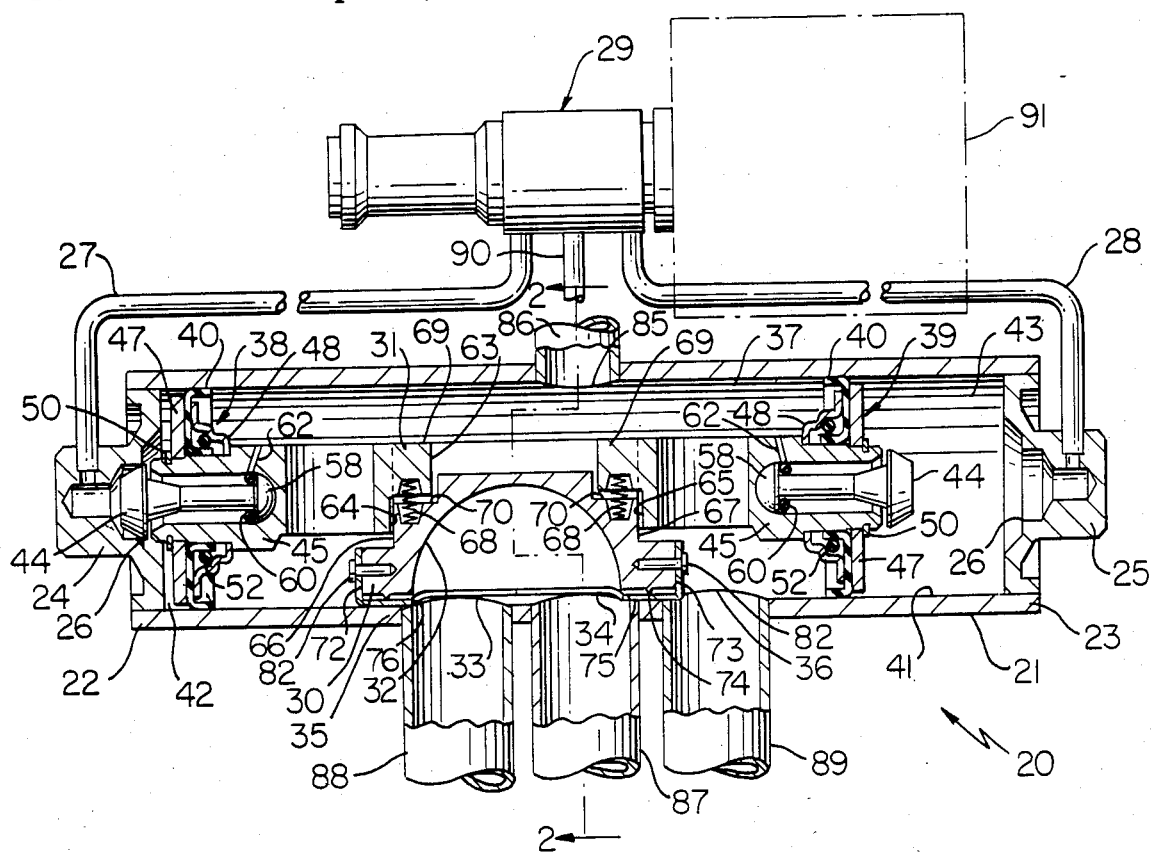
FIG. 1 is a fragmentary cross-sectional view of one embodiment of the improved reversing valve construction of this invention.

While the various features of this invention are hereinafter described and illustrated as being particularly adapted to provide a reversing valve construction for a heat pump system, it is to be understood that the various features of this invention can be utilized singly or in any combination thereof to provide a reversing valve construction for other systems as desired.

Therefore, this invention is not to be limited to only the embodiments illustrated in the drawings, because the drawings are merely utilized to illustrate one of the wide varieties of uses of this invention.

Figure 2:
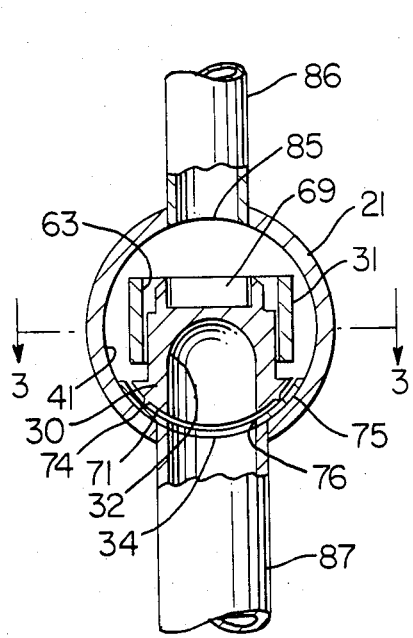
FIG. 2 is a fragmentary cross-sectional view taken on line 2—2 of FIG. 1.
Figure 3:
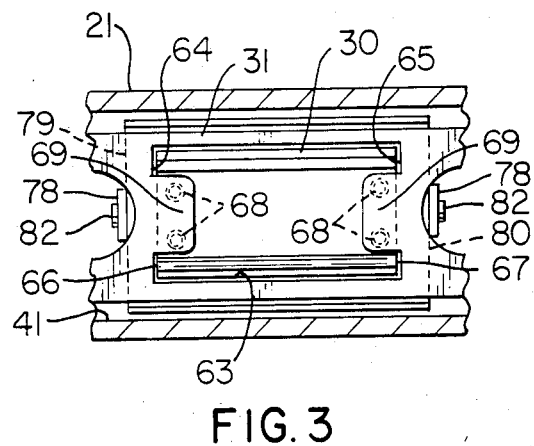
FIG. 3 is a fragmentary cross-sectional view taken on line 3—3 of FIG. 2.

Referring now to FIGS. 1-3, one embodiment of the improved reversing valve construction of this invention is generally indicated by the reference numeral 20 and comprises a substantially tubular housing means 21 having the opposed ends 22 and 23 thereof closed by like end members 24 and 25 respectively having valve seats 26 that lead from the interior of the housing member 21 respectively to conduit means 27 and 28 of a pilot valve means 29 utilized to reverse the operating condition of the valve construction 20 in a manner well known in the art and hereinafter described.

A main valve member 30 of the reversing valve construction 20 is slidingly disposed in the housing means 21 and is operatively interconnected to a piston unit 31 in a manner hereinafter set forth, the valve member 30 when disposed in its left-hand position as illustrated in FIG. 1, having a cavity 32 thereof bridging a pair of ports 33 and 34 in a valve seat means 35 of the housing means 21 while interconnecting another port 36 of the valve seat means 35 with a high pressure chamber 37 of the housing means 21 that is defined between opposed piston heads 38 and 39 of the piston unit 31.

When the main valve member 30 is moved from the position illustrated in FIG. 1 by the piston unit 31 to the right in FIG. 1 in a manner hereinafter set forth, the cavity 32 is adapted to bridge the ports 34 and 36 of the valve seat means while interconnecting the port 33 to the high pressure chamber 37 thereof for a purpose hereinafter set forth.

The piston heads 38 and 39 of the piston unit 31 are formed substantially identical to each other and each has a flexible seal member 40 disposed in sliding and sealing engagement with the internal peripheral surface 41 of the housing means 21 so as to define the high pressure chamber 37 between the piston heads 38 and 39 and a pair of control chambers 42 and 43 respectively between the ends 24 and 25 of the housing means 21 and the respective piston heads 38 and 39 for a purpose hereinafter described.

Each piston head 38 and 39 carries a poppet valve member 44 for respectively closing against its respective valve seat 26 when moved thereagainst by the piston unit 31.

For example, referencne is now made to FIG. 6 wherein the left-hand piston head 38 is illustrated and details thereof will now be described with the understanding that like details are provided for the right piston head 39 whereby like reference numerals will be utilized for the same parts of the left and right piston heads 38 and 39.

Figure 6:
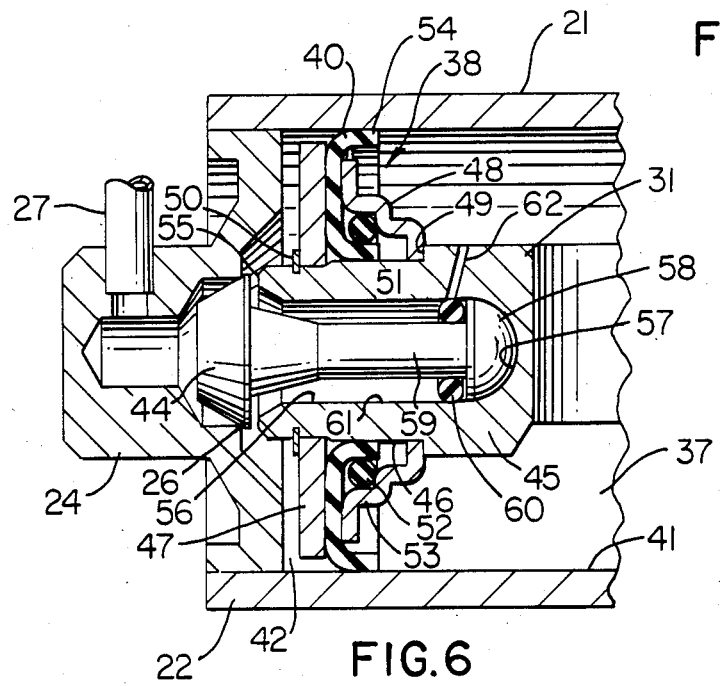
FIG. 6 is an enlarged fragmentary cross-sectional view of the left end of the reversing valve construction of FIG. 1 and illustrates one embodiment of the improved poppet valve member of this invention.

As illustrated in FIG. 6, the piston unit 31 includes a rigid member 45 formed of metal, plastic or other suitable material and has a cylindrical end 46 carrying the annular seal member 40 thereon between suitable retaining plates 47 and 48 held to the cylindrical end 46 of the piston unit 31 by an annular shoulder 49 of the member 45 and a retaining ring 50, an internal peripheral portion or lip 51 of the annular seal member 40 being held in sealing engagement with the cylindrical end 46 of the piston unit 31 by an annular O-ring 52 disposed in compressed relation between the lip 51 and an annular shoulder 53 of the backing plate 48. In this manner, an outer peripheral lip 54 of the annular seal member 40 is disposed in sliding and sealing engagement with the internal peripheral surface 41 of the housing member 21 which is substantially cylindrical as illustrated.

The end 46 of the piston member 45 of the piston unit 31 has an end surface interrupted by an opening 56 that defines an internal end surface 57, the end surface 57 being substantially hemispherical to mate with a substantially hemispherical end 58 of a stem 59 of the respective poppet valve member 44 to substantially universally mount the poppet valve member 44 to the piston head 38.

In particular, the stem 59 holds the poppet valve member 44 spaced from the end surface 55 of the end 46 of the piston unit 31 and the stem end 58 can swivel in substantially a universal manner within the limits of the opening 56 against the mating surface 57 of the opening 56 to permit the poppet valve member 44 to self-align itself with the valve seat 26 when seated thereagainst by the piston unit 31 moving to the left as illustrated in FIG. 6 whereby it is believed that improved sealing of the valve seat 26 is provided by the universally mounted poppet valve member 44 of this invention.

An annular O-ring 60 is carried on the valve stem 59 of each poppet valve member 44 in compressed relation between its stem 59 and the internal peripheral surface 61 of the respective end 46 of the piston unit 31 in order to hold the poppet valve member 44 in its assembled relation in the opening 56 as illustrated in FIG. 6, the O-ring 60 being sufficiently resilient to permit the aforementioned swivelling movement for the reasons previously set forth.

Each end 46 of the piston unit 31 includes an orifice passage 62 that leads from the high pressure chamber 37 of the housing means 21 to the respective opening 56 and, thus, to the control chamber 42 or 43 to permit the control chamber 42 or 43 to have the high pressure fluid from the chamber 37 bleed therein once the respective poppet valve member 44 has seated against its valve seat 26 for a purpose hereinafter described.

Thus, it can be seen that it is a relatively simple method of this invention to make the poppet valve members 44 of this invention in such a manner that the same are universally mounted to the piston unit 31 to respectively seat in self-aligning manner against the valve seats 26 of the end members 24 and 25 when moved thereagainst by the piston unit 31 in a manner herinafter set forth.

As illustrated in FIGS. 1–3, the piston unit 31 has a substantially rectangular cutout 63 formed substantially centrally between the piston heads 38 and 39, the cutout 63 defining vertically disposed opposed shoulder means 64 and 65 which are adapted to respectively abut against opposed shoulder means 66 and 67 of the valve member 30 to cause the valve member 30 to move therewith axially within the housing means 21.

However, the valve member 30 is transversely movable relative to the piston unit 31 in the cutout 63 thereof and is urged in a direction toward the valve seat 35 by suitable compression spring means 68 disposed between flange means 69 of the piston unit 31 that extend into the cutout 63 thereof from the opposed shoulders 64 and 65 thereof and shoulder means 70 of the valve member 30 as illustrated in FIG. 1. In this manner, the valve member 30 is urged by the force of the compression springs 68 in a sealing direction against the valve seat 35 for a purpose that will be apparent hereinafter.

The valve member 30 can be formed of any suitable material, such as metal, plastic, etc., and has an annular lower surface 71 that is arcuate in cross section as illustrated in FIG. 2 between opposed ends 72 and 73 thereof and is centrally interrupted by the cavity 32, the arcuate annular surface 71 being shaped similar to the arcuate internal peripheral surface 41 of the housing means 21 as illustrated in FIG. 2.

Figure 4:
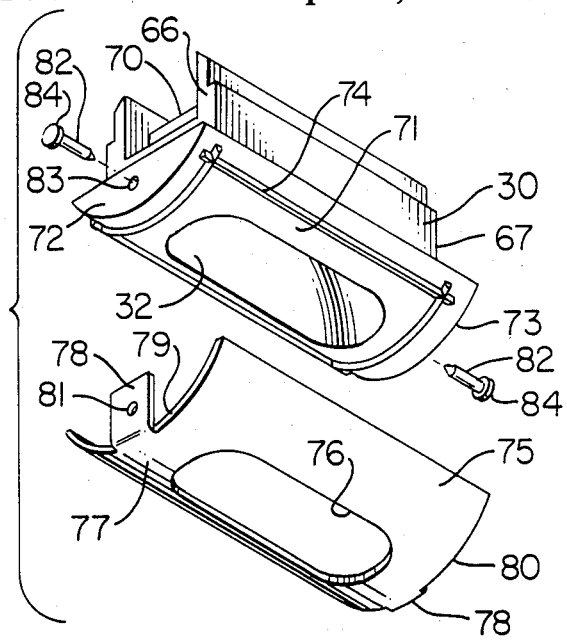
FIG. 4 is an exploded perspective view of the parts of the main valve member of the reversing valve construction of FIG. 1.

An annular projection 74 that is rigid and substantially V-shaped in cross section is formed on the annular surface 71 outboard of and around the cavity 32 of the valve member 30 as illustrated in FIG. 4 and defines any suitable configuration, the configuration of the projection 74 in the embodiment of this invention being substantially rectangular while following the contour of the surface 71 for a purpose hereinafter described.

Figure 5:
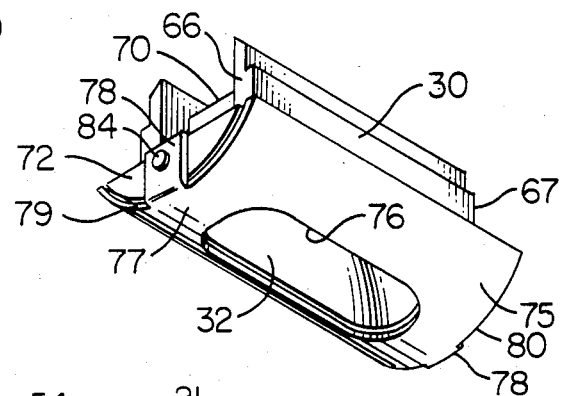
FIG. 5 is a perspective view illustrating the parts of the main valve member of FIG. 4 assembled together.

An annular flexible sealing member 75 formed of any suitable material, such as a plastic material sold under the Trademark "Teflon" by the DuPont Company of Wilmington, Del., is shaped in a manner to conform to the annular surface 71 of the valve member 30, as well as to the valve seat 35, and has an opening 76 passing therethrough to mate with the cavity 32 when disposed against the surface 71 as illustrated in FIG. 5, the sealing member 75 having an arcuate lower surface 77 which is adapted to be disposed in sliding and sealing engagement against the valve seat 35 of the housing 21 in the manner illustrated in FIGS. 1 and 2.

The annular sealing member 75 has a pair of integral tabs 78 extending beyond opposed ends 79 and 80 of the sealing member 75 and are respectively provided with openings 81 therethrough so as to be fastened to the opposed ends 72 and 73 of the valve member 30 by nail-like members 82 which pass through the openings 81 and into openings 83 in the ends 72 and 73 of the valve member 30 to sandwich and hold the tabs 78 against the ends 72 and 73 of the valve member 30 by the enlarged heads 84 of the nail-like members 82 as illustrated in FIG. 5.

When the completed valve member assembly 30 of FIG. 5. is assembled with the piston unit 31 in the housing means 21 of the reversing valve construction 20 of this invention, the force of the compression springs 68 urge the valve member 30 downwardly in FIGS. 1 and 2 causing the rigid annular projection 74 of the valve member 30 to engage against the annular sealing member 75 and force the same into sealing engagement with the valve seat surface 35 outboard of and completely around the cavity 32 in substantially a line manner to conform to the contour of the valve seat surface 35 and thereby to effectively seal thereagainst while permitting sliding movement of the valve member 30 relative to the valve seat 35 by the piston unit 31 in a manner hereinafter set forth.

The aforementioned forcing of the valve member 30 toward the valve seat surface 35 by the compression spring 68 is aided by the resulting pressure differential that acts across the valve member 30 when a high pressure is created in the chamber 37 and a low pressure is created in the cavity 32 as will be apparent hereinafter so that the V-shaped rigid ridge or projection 74 on the valve member 30 effectively cold flows the engaged portion of the annular seal member into sealing engagement with the valve seat surface 35 outboard of and completely around the cavity 32.

Therefore, it can be seen that it is a relatively simple method of this invention to make the valve member 30 and its annular seal member 75 of this invention to effectively seal against the valve seat means 35 of the housing means 21.

A high pressure port 85 is formed through the housing means 21 opposite the valve seat means 35 thereof and is interconnected to a conduit means 86 that leads to the high pressure side of a compressor (not shown) of a heat pump system (not shown) while the low pressure side of the compressor is interconnected by a conduit 87 to the port 34 of the valve seat means 35. The port 33 of the valve seat means 35 is adapted to be interconnected by a conduit 88 to an inside coil of the heat pump system while the port 36 is adapted to be interconnected to the outside coil of the heat pump system by a conduit 89.

The pilot valve means 29 has a conduit 90 interconnected to the suction or low pressure conduit 87 and is adapted to be interconnected to the high pressure conduit 86 by another conduit (not shown) whereby the pilot valve means 29 is adapted to be operated by a solenoid means 91 in a manner well known in the art to operate the reversing valve construction 20 of this invention in a manner now to be described.

When the reversing valve construction 20 is disposed in the condition illustrated in FIG. 1 wherein the left-hand poppet valve member 44 is closing off the left-hand valve seat 26, the pilot valve means 29 is in such a condition that the same is interconnecting the low pressure conduit 90 to the conduit 27 to maintain a vacuum on the left-hand side of the poppet valve member 44 holding the piston unit 31 and, thus, the valve member 30 in the position illustrated in FIG. 1 whereby the inside coil conduit 88 is interconnected to the suction conduit 87 and the high pressure from the compressor that is being directed by the conduit 86 into the high pressure chamber 37 is interconnected to the outside coil by the conduit 89. The pilot valve means 29 at this time is also interconnecting the high pressure from the compressor to the control chamber 43 by means of the conduit 28.

Thus, the pressure differential acting across the valve member 30 of this invention by the high pressure in the chamber 37 and low pressure in the cavity 32, as well as the force of the springs 68, causes the rigid rib means 74 to cold flow the engaged portion of the annular sealing member 75 into sealing relation with the valve seat surface 35 completely around the cavity 32 and, thus, around the ports 33 and 34 so as to prevent any fluid leakage from the high pressure chamber 37 into the low pressure conduit 87.

When it is desired to reverse the condition of the reversing valve construction 20 of FIG. 1, the pilot valve means 29 is operated by its solenoid coil 91 to interconnect the high pressure of the compressor to the conduit 27 and the low pressure conduit 90 to the conduit 28. In this manner, a suction is created in the control chamber 43 so that the resulting pressure differential acting across the piston head assembly 39 causes the piston unit 31 to move from left to right in FIG. 1 until the poppet valve member 44 of the piston head 39 thereof closes off the valve seat 26, such movement of the piston unit 31 causing the left-hand poppet valve member 44 to move away from the valve seat 26 and permit high pressure to be directed into the control chamber 42 so that no pressure differential acts across the left-hand piston head assembly 38.

When the piston unit 31 has been moved to the right in FIG. 1, the cavity 32 of the valve member 30 now bridges the ports 34 and 36 so that the suction conduit 87 is interconnected to the outside coil conduit 89 and the inside coil conduit 88 is now interconnected to the high pressure chamber 37, the valve member 30 having the rigid ridge 74 cold flow the annular seal member 35 into sealing relation around the bridged ports 34 and 36 in its new position as previously described to prevent fluid leakage from the high pressure chamber 37 to the suction conduit 87.

With the right-hand poppet valve member 44 now closing off the valve seat 26 to disconnect the flow of pressure from the control chamber 43 to the suction side of the compressor, the control chamber 43 can now bleed high pressure fluid from the chamber 37 through the orifice passage 62 to permit the pressure in the control chamber 43 to equalize with the pressure in the high pressure chamber 37 so that the piston unit 31 is held to the right only by the suction being imposed upon the right side of the poppet valve member 44. This permits the piston unit 31 to be returned to the right in FIG. 1 when the pilot valve means 29 again interconnects the suction conduit 90 to the conduit 27 and the high pressure to the conduit 28 to thereby provide a vacuum in the control chamber 42 to move the piston unit 31 back to the left by the resulting pressure differential acting across the left-hand piston unit 39 so that the suction in the control chamber 42 does not have to overcome any adverse suction remaining in the control chamber 43.

Therefore, it can be seen that it believed that this invention not only provides improved sealing of the valve member 30 to the valve seat means 35 through the annular flexible sealing member 75 and the rigid annular projection 74, but also this invention provides improved poppet valve means 44 for self-aligning with the valve seats 26 to prevent fluid leakage therebetween.

Another embodiment of the reversing valve construction of this invention is generally indicated by the reference numeral 20A in FIGS. 7–14 and parts thereof similar to the reversing valve construction 20 previously described are indicated by like reference numerals followed by the reference letter "A".

Figure 7:
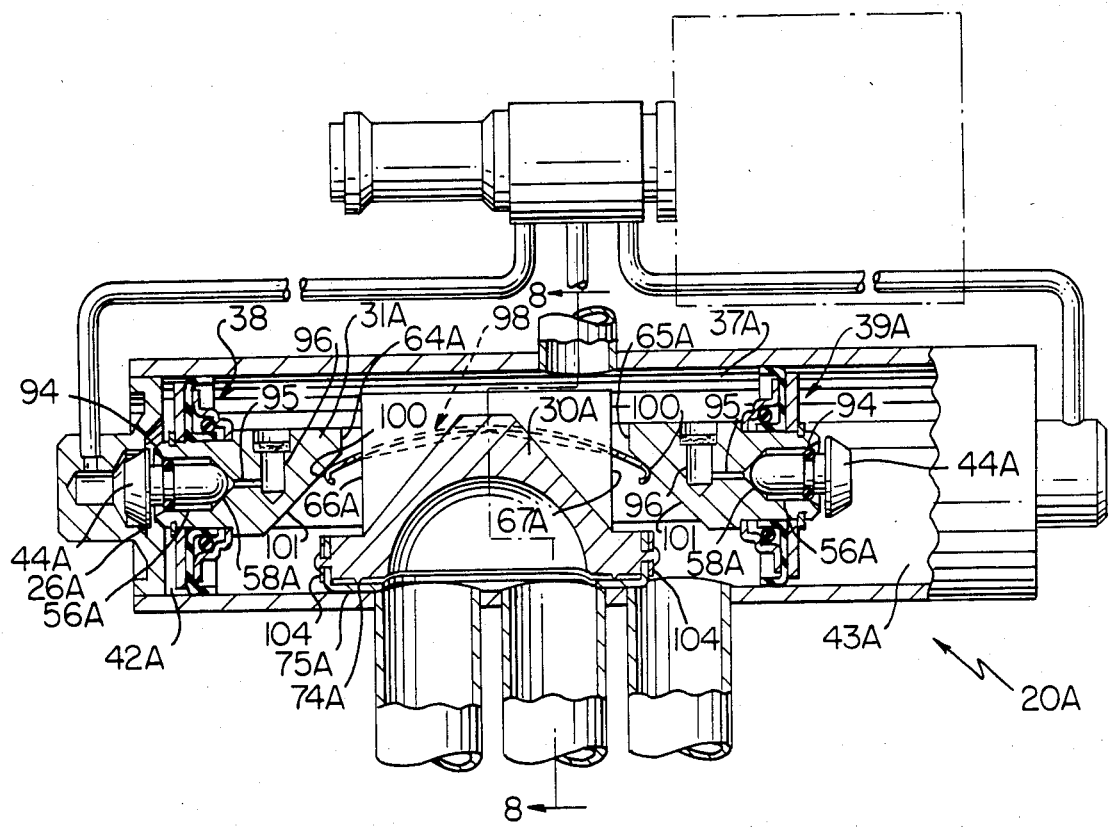
FIG. 7 is a view similar to FIG. 1 and illustrates another embodiment of the reversing valve construction of this invention.
Figure 8:
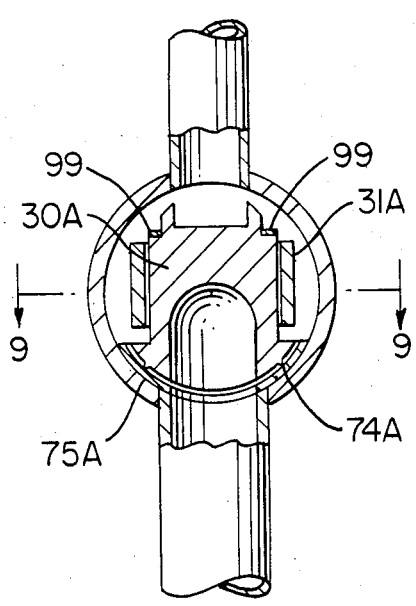
FIG. 8 is a fragmentary cross-sectional view taken on line 8—8 of FIG. 7.
Figure 9:
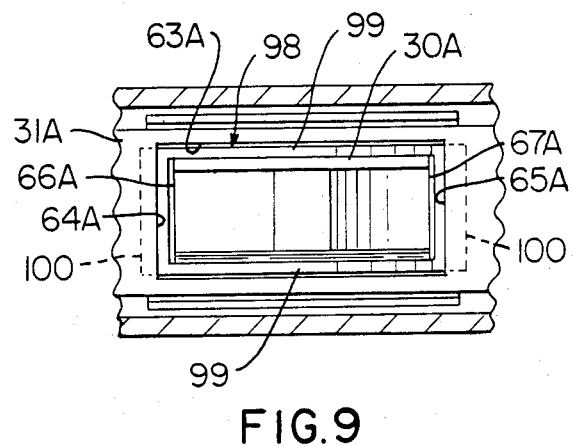
FIG. 9 is a fragmentary cross-sectional view taken on line 9—9 of FIG. 8.
Figure 14:
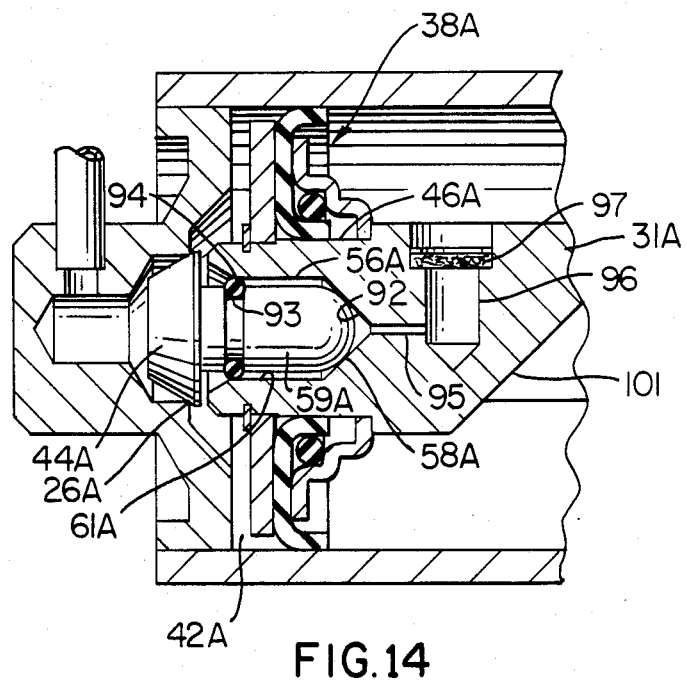
FIG. 14 is an enlarged fragmentary left-hand view of the reversing valve construction of FIG. 7 and illustrates another embodiment of the improved poppet valve member of this invention.

As illustrated in FIGS. 7–9, the reversing valve construction 20A is basically the same as the reversing valve construction 20 previously described except that the piston unit 31A has each opening means 56A for its respective poppet valve member 44A defining a substantially frustoconical surface 92, FIG. 14, against which the hemispherical end 58A of the stem 59A of the respective poppet valve member 44A mates in substantially circular line contact in order to universally mount the poppet valve member 44A to the respective piston head assembly 38A or 39A.

In addition, the stem 59A of each poppet valve member 44A has an annular groove 93 formed therein and receiving an annular resilient sealing O-ring member 94 which seals against the internal peripheral surfaces 61A of the end 46A of piston unit 31A while still permitting the swivelling self-aligning movement of the respective poppet valve member 44A within the limits of the respective opening 56A.

Also, the surface 92 in each end 46A of the piston unit 31A opens to a passage 95 that is interconnected to the high pressure chamber 37A by a cross passage 96 that has a suitable filter 97 therein, the passages 96 and 95 permitting bleeding of the high pressure to the respective control chamber 42A or 43A as previously set forth.

Therefore, it can be seen that the poppet valve members 44A of the reversing valve construction 20A are universally mounted to the respective piston head assemblies 38A and 39A as the hemispherical ends 58A thereof, in effect, swivel against the respective conical surfaces 92 in order to permit the poppet valve members 44A to self-align with the valve seats 26A for the purposes previously set forth.

Figure 13:
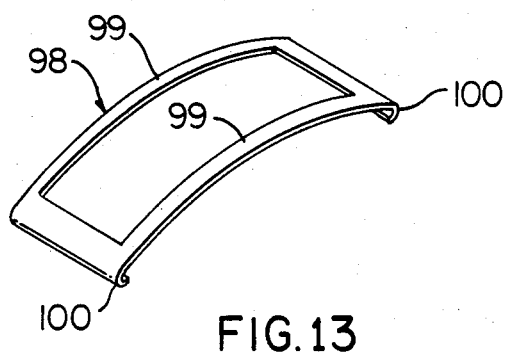
FIG. 13 is a perspective view of the spring means of the reversing valve of FIG. 7 that urges the main valve member of FIG. 12 in its valve seat sealing relation.

It can also be seen that the valve construction 20A has a leaf spring means 98 in place of the compression springs 68 previously described, the leaf spring means 98 comprising two separate leaf springs on each side of the valve member 30A or comprising a single member as illustrated in FIG. 13 which has two leaf strips 99 respectively interconnected together by curled end portions 100 which are respectively adapted to engage under angled surfaces 101 of the piston unit 31A on opposite sides of the rectangular cutout 63A thereof that defines the shoulders 64A for abutting against the opposed shoulders 66A and 67A of the valve member 31A to cause the same to axially move with the piston unit 31A in the manner previously described for the reversing valve construction 20.

Figure 10:
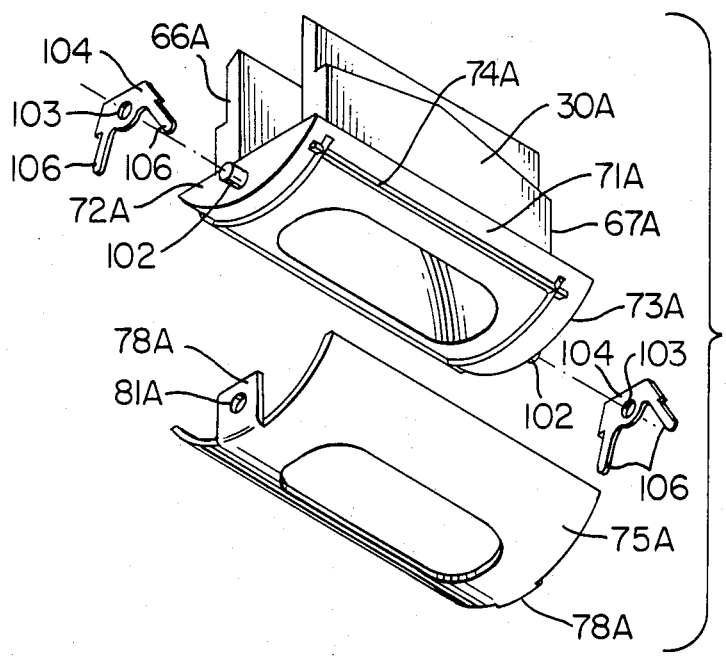
FIG. 10 is an exploded perspective view of the various parts for forming the main valve member of the reversing valve construction of FIG. 7.
Figure 12:
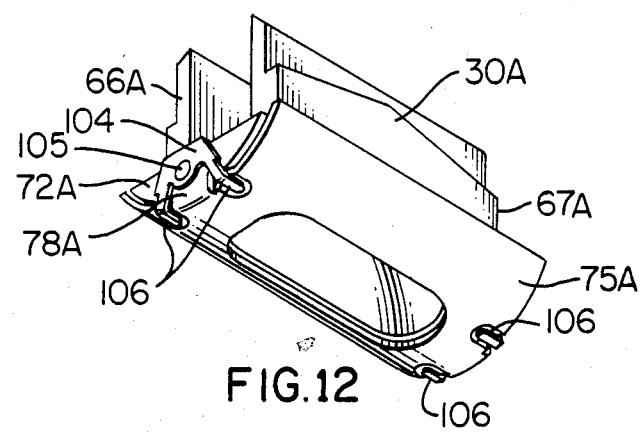
FIG. 12 is a perspective view illustrating the parts of FIG. 10 in their finally assembled condition.
Figure 11:
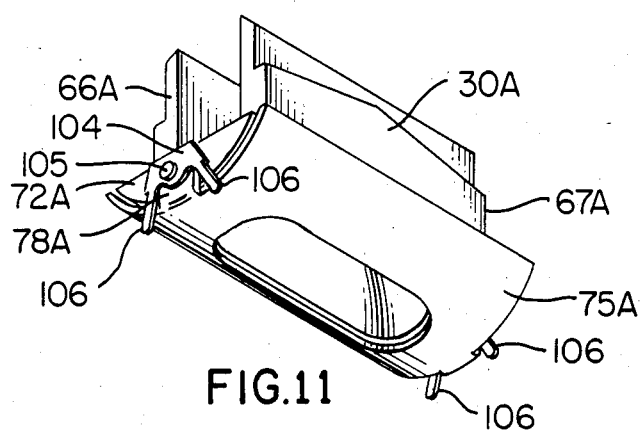
FIG. 11 is a perspective view illustrating the parts of FIG. 10 partially assembled together.

As illustrated in FIGS. 10–12, it can be seen that the valve member 30A has integral cylindrical projections 102 extending respectively from the ends 72A and 73A thereof to pass through the openings 81A in the tabs 78A of the annular flexible sealing member 75A as well as through the openings 103 in clip members 104 which are subsequently held in position as illustrated in FIGS. 11 and 12 by upsetting or turning over the ends 105 of the projections 102 to securely fasten the clips 104 and annular sealing member 75A to the valve member 30A. Thereafter, tangs 106 of the clips 104 are bent over the body portion of the annular sealing member 75A as illustrated in FIG. 12 to distribute the holding force of the projections 102 over a relatively large area of the sealing member 75A.

However, the sealing member 75A performs a sealing function for the valve member 30A in the same manner as the sealing member 75 of the valve member 30 previously described as the annular surface 71A of the valve member 30A has the annular V-shaped rigid projection 74A that urges the sealing member 75A into its cold flow sealing condition under the force of the leaf spring means 98 and the pressure differential acting across the valve member 30A as previously set forth.

Therefore, it can be seen that the reversing valve construction 20A of this invention functions and operates in the same manner as the valve construction 20 previously described to provide for reversing a heat pump system or the like whereby the operation of the valve construction 20A will not be described.

Therefore, it can be seen that this invention not only provides an improved reversing valve construction, but also this invention provides an improved method of making such a reversing valve construction or the like.

While the forms and methods of this invention now preferred have been illustrated and described as required by the Patent Statute, it is to be understood that other forms and method steps can be utilized and still fall within the scope of the appended claims.

What is claimed is:

1. In a method of making a reversing valve construction having a housing means provided with a chamber carrying a movable valve member therein that controls port means of a valve seat means of said housing means through the relative position of a cavity of said valve member relative to said port means, said port means comprising first, second and third ports disposed in spaced apart and straight line relation and said cavity bridging said first and second ports while exposing said chamber to said third port when said valve member is in one position thereof and bridging said second and third ports while exposing said chamber to said first port when said valve member is in another position thereof, said valve member carrying a flexible annular sealing member that is disposed between an annular surface of said valve member and said valve seat means and surrounds said cavity to seal said cavity to said valve seat means while permitting sliding movement therebetween, said housing means carrying biasing means that is operatively associated with said valve member and said housing means to urge and flex said sealing member into sealing engagement with said valve seat means so as to tend to sealingly conform said flexible sealing member to the contour of said valve seat means, the improvement comprising the steps of forming said valve member to have a rigid annular projection that extends from said annular surface thereof and that engages an annular portion of said annular sealing member outboard of and around said cavity, forming said annular sealing member from a plastic material that has cold flowing characteristics, securing said annular sealing member to said valve member only in areas thereof that are remote from said engaged portion thereof so that said engaged portion is adapted to move relative to said rigid annular projection, and cold flowing said engaged portion of said annular sealing member into said sealing engagement with said valve seat means by the action of said biasing means and said rigid annular projection.

2. A method of making a reversing valve construction as set forth in claim 1 and including the step of forming said annular projection to have a substantially V-shaped cross-sectional configuration.

3. A method of making a reversing valve construction as set forth in claim 1 and including the step of forming said annular projection to define a substantially rectangular outline.

4. A method of making a reversing valve construction as set forth in claim 1 wherein the step of securing comprises the step of securing a pair of opposed tabs of said annular sealing member to said valve member.

5. A method of making a reversing valve construction as set forth in claim 4 and including the steps of providing a pair of opposed clip means to be carried by said valve member, and respectively holding opposed portions of said annular sealing member that are remote from said engaged portion thereof to said annular surface of said valve member with said clip means.

* * * * *